Figure 1:
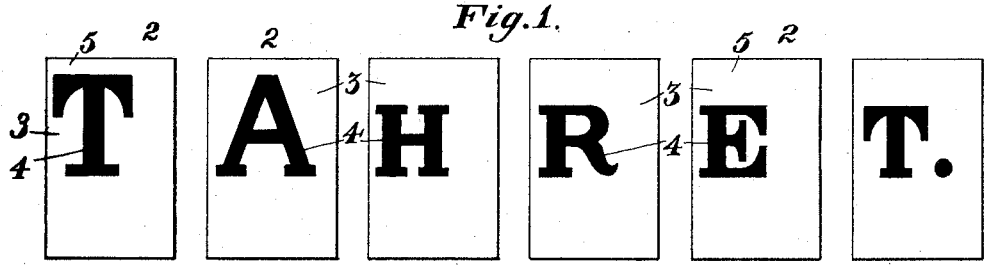

No. 632,437. Patented Sept. 5, 1899.
J. T. BENTLEY.
MEANS FOR AND PROCESS OF MAKING PRINTING SURFACES BY PHOTOGRAPHY.
(Application filed Oct. 1, 1898.)
(No Model.) 2 Sheets—Sheet 1.

Witnesses
A. B. Mattingly.
Fred. J. Dole.

Inventor.
John. T. Bentley
By his Attorney
F. H. Richards.

No. 632,437. Patented Sept. 5, 1899.
J. T. BENTLEY.
MEANS FOR AND PROCESS OF MAKING PRINTING SURFACES BY PHOTOGRAPHY.
(Application filed Oct. 1, 1898.)
(No Model.) 2 Sheets—Sheet 2.
Fig. 6.
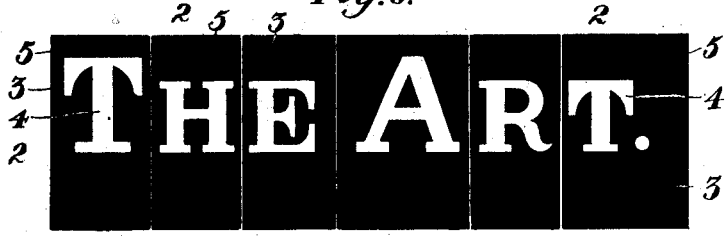
Fig. 7.
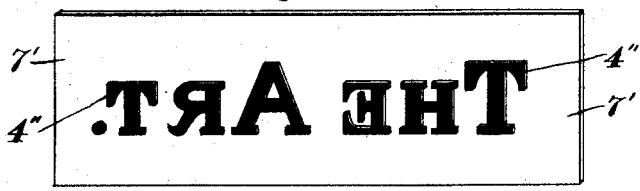
Fig. 8.
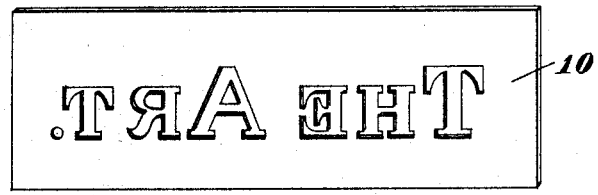
Fig. 9.
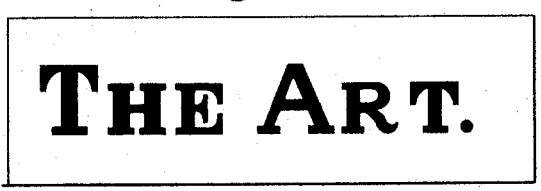
Fig. 10. Fig. 11. Fig. 12.
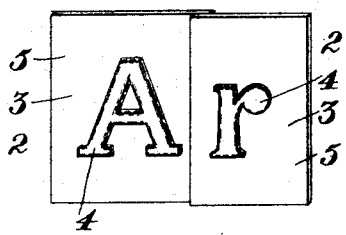 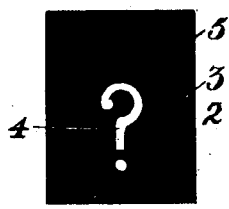 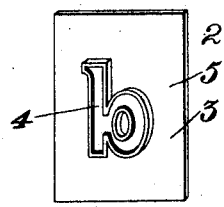
Fig. 13.
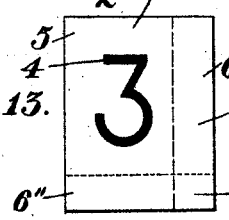
Witnesses.
A. B. Mattingly
Fred. J. Dole.
Inventor.
John T. Bentley
By his Attorney
F. H. Richards.

UNITED STATES PATENT OFFICE.

JOHN T. BENTLEY, OF ENGLEWOOD, NEW JERSEY.

MEANS FOR AND PROCESS OF MAKING PRINTING-SURFACES BY PHOTOGRAPHY.

SPECIFICATION forming part of Letters Patent No. 632,437, dated September 5, 1899.

Application filed October 1, 1898. Serial No. 692,420. (No model.)

*To all whom it may concern:*

Be it known that I, JOHN T. BENTLEY, a subject of the Queen of Great Britain, residing in Englewood, in the county of Bergen and State of New Jersey, have invented certain new and useful Improvements in Means for and Art of Making Printing-Surfaces, of which the following is a specification.

This invention relates to the art of printing, and more particularly relates to the production of printing-surfaces by photography; and it comprises in a general way the reproduction by the action of light of independent photographable originals comprising models interchangeable with each other and each formed free of a strip or bar and comprising, for instance, independent surfaces bearing characters, letters, figures, &c., of an alphabet, and which can be assembled to form various subjects or letter-press matter to be reproduced and when assembled will comprise a word or any amount of matter—such as a number of lines, of a column, or a page, or a plurality thereof, either of book or newspaper size.

An object of the invention is to furnish an improvement in the art of typographic composition whereby printing surfaces or plates adapted for use in the making of newspapers, books, and the like are quickly and inexpensively produced by a simple and direct operation or process and without the employment of any print-imparting devices or type during such operation, and which printing plates or surfaces are produced with their printing-faces in relief or in intaglio, or neither in relief nor in intaglio, as ordinarily understood.

Another object of the invention is to provide improved originals from which reproductions or printing-surfaces are directly obtained by photography or analogous means, and which reproductions in one form thereof are directly used as intaglio printing-surfaces or utilized as an intermediate instrumentality to produce printing-surfaces in relief or otherwise and in another form thereof are directly used as printing-surfaces in relief or otherwise to impart impressions or utilized as an intermediate instrumentality to produce independent printing-surfaces in intaglio.

A further object of the invention is to provide a system of independent and interchangeable or readily-separable photographable originals each formed free of a strip or bar and which are readily assembled to comprise a word or any amount of matter—such as a number of lines, a column, or a page, or a plurality thereof, either of book or newspaper size—and also readily assembled to produce different subjects-matter, and from which originals when once assembled various sizes and forms of matter are obtained by a direct process, and which originals are assembled in a readable manner, thereby obviating the necessity of having a proof in order to detect errors.

Figure 2:
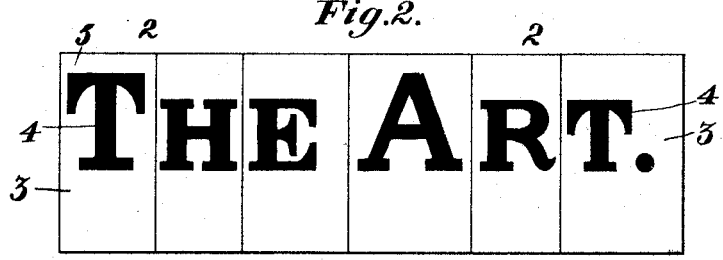
Figure 3:
Figure 4:
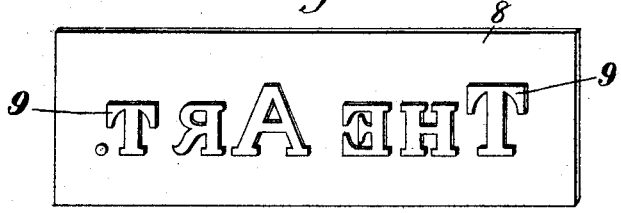
Figure 5:
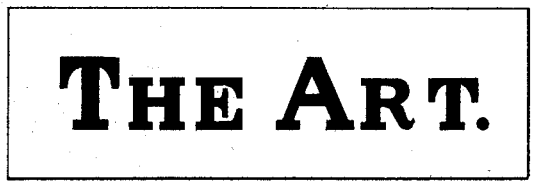

In the drawings accompanying and forming part of this specification, Figure 1 represents a view of a few of the originals formed substantially in the manner hereinafter set forth. Fig. 2 represents such originals properly assembled to form the subject-matter to be reproduced to form a printing-surface. Fig. 3 represents a negative of the matter shown in Fig. 2, such matter being somewhat reduced, and which negative is suitably treated so that it may be used as an intaglio printing-surface, or it may be utilized as an intermediate instrumentality to produce a printing-surface in relief or otherwise. Fig. 4 represents in perspective a printing surface or plate secured by the utilization of such negative as an intermediate instrumentality, the printing-faces thereof being in relief. Fig. 5 represents a print or impression taken from such printing plate or surface. Fig. 6 represents a few of the originals formed and assembled in a different manner from that shown in Figs. 1 and 2. Fig. 7 represents a reproduction thereof adapted to be used as a printing-surface, such reproduction being somewhat reduced. Fig. 8 represents in perspective an intaglio printing-surface produced by the utilization of such reproduction as an intermediate instrumentality. Fig. 9 represents a print or impression taken from such intaglio surface. Fig. 10 represents in perspective another form of this original, the characters or character-fields thereof being represented as structurally formed or in relief. Fig. 11 represents an original with the field surrounding the character-fields in relief. Fig. 12 represents in perspective an original having its character-field provided with reinforced or structurally-formed borders or boundaries, and Fig. 13 represents the original having its model-field provided with extensions.

Similar characters of reference designate corresponding parts in the different figures of the drawings.

Heretofore in order to produce practicable printing-surfaces, and especially printing-surfaces capable of furnishing columns or pages of printing matter at one operation, it has been necessary to use type or printing devices in some form thereof in the first instance directly to impart impressions, since type is not photographable, or to form a matrix of which suitable stereotypes or electrotypes were made for a like purpose. This type, which is formed of metal, is not only expensive to manufacture, but in establishments doing considerable business it is necessary to have many fonts of the same corresponding with the different sizes of the print desired, as nonpareil, brevier, bourgeois, long primer, pica, &c., thus requiring an outlay of many thousands of dollars, and, since the life of type is comparatively short, in order to produce good work frequent renewals or resupplies are necessary. In addition to this it is also necessary to have many expensive and elaborate appurtenances in order to conveniently use such type. Moreover, in the use of such type it is necessary to set the same up backward or in reverse manner, so that a proof is required to enable the errors to be readily perceived. Furthermore, when a reproduction is desired on a smaller scale it is the necessary practice to set up the type and secure an impression therefrom, or from a matrix of the type-form a stereotype or electrotype is made, from which an impression is obtained. In either case this impression produced from type and having imparted to it all the defects and imperfections which may, owing to wear and other causes, be in the type-faces, is placed before the camera and constitutes the original for the purposes of photoreproduction. This, it will be seen, since it is necessary to produce an original each time from type, which itself must be first produced or set up in order to enable such original to be reproduced on a different or a smaller scale, is not only an indirect manner of securing such reproduction, but is expensive and laborious to carry out. Moreover, since type from which the impression is made is usually of comparatively small size and imperfect in its formation, considerable touching up during the process of reproduction by an engraver, often involving weeks of work, is necessary to produce reasonably good work.

The object, therefore, of the present invention is to produce a printing-surface—such, for instance, as a printing-plate—by a direct process and without the use of type during the operation of producing such surface, and, furthermore, to produce such surface from an original comprising independent and interchangeable photographable elements each formed free of a strip or bar and which are not subject to wear during the production of such surface and from which same original any desired size of reproduction may be secured, corresponding, for instance, with nonpareil, brevier, bourgeois, long primer, or pica and larger, and which original, moreover, may be variously assembled to form any desired subject-matter to be reproduced and also so assembled that the whole will form a word or any desired amount of matter—such as a number of lines, a column, or a page, or a plurality thereof, either of book or newspaper size—and can also be assembled in a readable manner, whereby errors may be readily detected without the necessity of having a proof for this purpose.

The invention therefore comprises in a general way the production of a printing-surface containing letter-press or analogous matter, on some suitable material, directly from original matter comprising independent and separable elements or models each having structures formed free of a strip or bar and without the use of type at any time during the production of such printing-surface.

The invention also comprises the production of a printing-surface adapted to impart impressions from a series of independent and interchangeable or separable originals each of which comprises an element of the subject-matter to be reproduced and is formed free of a strip or bar and which originals are variously assembled to produce different subjects-matter and are also, if desired, shiftable relatively to each other.

I am aware that in a few instances by photography letter-press matter has been directly reproduced; but in such instances the matter to be reproduced is not only formed on strips or bars, but is without structure free of such strips or bars, and, moreover, can only be photographed one line at a time, so that for these, as well as for many other reasons, this mode of reproduction is impracticable and incapable of use in a commercial way. I am also aware that by photography letter-press matter has been reproduced; but in such instances the matter to be reproduced is not only obtainable by the use of type, which up to the present invention has been the only commercially-successful mode, but such matter is printed or made on a continuous sheet or card, forming a continuous word, phrase, or sentence, the elements or letters composing such phrase or sentence not being detachable from each other or capable of mutual independent adjustment or interchangeability, so as to permit a reassemblage thereof to form a different subject-matter. For instance, while a paper bearing the word "Witnesses" thereon may have been photographed side by side with another sheet bearing the words "Inventor and assignor" it has been impracticable to detach or separate each letter or a plurality thereof of either word, so as to produce by the use of the same letters differently assembled another subject-matter or to even separate the words of the phrase or sentence to likewise form a different subject-matter. Furthermore, it is also impossible to correct any error in spelling in such phrases except by erasure, whereas in the present improvement this is readily obtained by the mere removal of one letter or word and the substitution of another letter or word therefor. Therefore this invention comprises the use of independent, separable, and interchangeable photographable originals each formed free of a strip or bar and comprehending models which will ordinarily comprise independent surfaces bearing characters, letters, figures, symbols, or analogous matter adapted to be assembled in any desired manner to form the matter—such, for instance, the letter-press matter—to be directly reproduced, and which models will consist of a letter or word and each of which is shiftable relatively to each other and also separable or removable independently of each other, if desired. Each of these models when formed as independent characters can be constructed independently of a supporting surface or field and supported in some suitable manner for reproduction; but in the form thereof herein shown and described, and which may be its preferred form, if desired, each of these models 2 comprises a support or supporting-surface 3, having thereon the desired character, letter, figure, or analogous symbol constituting one of the elements of the subject-matter or letter-press matter to be reproduced, the elements shown herein being represented as letters of the English alphabet. These letters, characters, or figures in this form thereof are stamped, impressed, embossed, or otherwise secured to or formed on or with the supports or supporting-surfaces, so that when so formed each model will comprise a plurality of fields, one constituting the support or supporting field or surface 3 and the other the character or letter or character-field 4, the whole forming what is herein designated for the present purpose as a "model-field" 5. I desire to state that each supporting surface or field 3 when this form of model is used may carry a plurality of characters—as, for instance, a letter and a punctuation-mark—such, for instance, as a comma—or sufficient characters to constitute a word—such, for instance, as a commonly-used word, such as the conjunctions and prepositions—whereby such words are separable or interchangeable and can be disposed at various parts of a sentence during the formation thereof.

When the models comprise supporting-surfaces, such surfaces are formed of any desired size adapted to support the preferred size of character-fields, which are preferably made of a relatively large size and are constructed of some suitable material bearing one or more characters or analogous symbols, as deemed desirable, and are usually in the nature of cards. By the term "cards," however, as used herein is not necessarily meant a card of pasteboard, since such cards may be made of any material—such as celluloid, metal, or otherwise, and of any suitable construction and size—the term "card" being used for the present purposes simply to designate a surface of that general form or character.

It is to be understood that any instrumentality or means may be used to support the models in position, and, if desired, such models may be formed or set up by some suitable mechanism or automatic means in a similar manner, if desired, to that in which type are formed or set up, or such models may be set up by the use of a composing-stick adapted for the purpose, from which they can be transferred to a suitable supporting means, or which stick can itself be suitably supported in position to permit the matter carried thereby to be reproduced.

When the models are made with a supporting surface or field, such supporting surface or field portion may form or have adjacent thereto what are herein termed "extensions" 6, one, as 6', adapted to underlap the supporting surface or field of an adjacent model, and one, 6'', adapted to underlap an adjacent line of assembled models, whereby the models are adapted for adjustment or shiftable movement relatively to each other in the direction of the assembled line and also transversely of the line, so that such models when assembled will have in the case of any particular character a variable adjustment relatively to the other characters, thereby to give such a matter a particular emphasis, if desired, substantially as set forth in my contemporaneously pending and allowed application for Letters Patent of the United States, Serial No. 684,424, filed June 24, 1898.

The character-fields of the models in some forms have structural formation or may when disposed on a supporting-surface have surface extension only, and therefore within the scope of my present invention is considered any form of photographable model, either formed or having structure free of a strip or bar and which can be assembled in position in the manner hereinbefore set forth to be photographed, and, if found desirable, the models can be made in a similar manner to those shown and described in my various contemporaneously-pending applications for Letters Patent of the United States—as, for instance, application, Serial No. 668,728, filed February 1, 1898, or application, Serial No. 692,158, filed September 29, 1898, the first application being for a process of producing printing-surfaces in which a symbol having an edge or boundary of different efficiency from the body of such symbol constitutes the original to be reproduced, and the second application being for a process of producing printing-surfaces in which a symbol constituting the original to be reproduced has the inner edge or boundary of its surrounding field forming the outline of the symbol of a different efficiency from the body of the symbol and from the surrounding field. The model-field in one form thereof (see Fig. 1) will have the supporting-surface 3 white or of one color or shade, while the character 4 thereof will be black or of another color or shade, whereby the model will be of different efficiencies, one part of lower or higher photographic efficiency than another part thereof, and will be in the nature of a positive original, or (see Fig. 6) the character 4 will be white or of one color or shade, while the supporting-surface 3 will be black or of another color or shade, and therefore in the nature of a negative original. In practice, however, good results are obtained by forming the character either black or white, while the supporting-surface may be correspondingly white or black. When the character or character-field 4 is black or of a shade or color having, as ordinarily understood, less photographic efficiency or actinic action than the supporting or surrounding field, a negative 7 is formed, in which the corresponding character-field portion 4' will be relatively transparent or clear and unhardened, so that such field portion 4' is removable to permit an intaglio printing-surface to be formed by a similar treatment, if desired, to that hereinafter set forth in connection with the formation of an intaglio plate when a negative is utilized as an intermediate instrumentality, or by means of such negative a printing-surface in relief or otherwise is obtainable on metal or other suitable material, and when in relief it will be produced substantially in the manner hereinafter set forth. By the use of a model in which the character or character-field 4 is white or of a color or shade having, as ordinarily understood, higher photographic efficiency or actinic action than the surrounding or supporting field 3 a negative or printing surface is obtained in which the corresponding field portion 4'' will be relatively dark or opaque and relatively hard, so that it can be used with or without further treatment as an ink-printing surface or can be used as a light-printing medium or surface to form an intaglio printing-surface on metal or other suitable material, substantially in the manner hereinafter set forth.

It is to be understood that in the production of the negative either as an ink-printing surface or as a light-printing surface—and by the term "light-printing surface" is meant a surface or medium which will permit the passage therethrough of the rays of light—such negative will comprise some suitable film or a support or backing carrying some suitable film or sensitized surface adapted for the purpose. For instance, such backing can comprise glass or an analogous light-transmitting material, or when such negative is to be directly treated to constitute a printing-surface it can consist of metal, such as aluminium, zinc, or other material. When, however, the negative is to be used as an intermediate instrumentality to produce a printing-surface it will be understood of course that it comprises some suitable film or backing which will permit the passage of the light therethrough, and when such negative is utilized in this manner for the purpose of forming thereby a printing-surface such surface will be also formed of any suitable material—metal or otherwise—such, for instance, when of metal, as aluminium, copper, or zinc.

In carrying out this improved process the independent models are assembled (see Figs. 2 and 6) either by hand or mechanical means into groups, columns, or pages, as may be desired, corresponding in organization with the required arrangement of the matter on the printing-plate, and the assembled group or groups of independent photographable models are then reproduced either to form a printing surface or plate or to form a reproduction or negative which can be utilized as an intermediate instrumentality to form a printing surface or plate. When the models are formed with a supporting-surface, I can employ the process and apparatus set forth in my prior allowed application hereinbefore referred to for Letters Patent of the United States, Serial No. 684,424, filed June 24, 1898, by means of which these photographable models are conveniently supported in position for reproduction. In some instances, however, if desired, the model-fields can be supported in a horizontal plane with the reproduction apparatus or camera above them, thereby to avoid shadow around such model-fields should they be of a formation which would tend to create shadow. When the models are formed with white or analogous character-fields and of black or analogous supporting-surfaces, the overlapping of the cards for the purpose of avoiding shadow is not necessary in all cases and they can therefore be disposed edge to edge (see Fig. 6) or in any other suitable way, if desired.

In the formation of a printing-plate in relief positive originals or models, preferably having a black or analogous character-surface 4 with a white or analogous supporting-surface 3, are preferably employed, whereby in the reproduction thereof—as, for instance, by photography, a negative 7 (see Fig. 3) is obtained, having the corresponding character-surface 4' relatively transparent or clear and the corresponding supporting or surrounding surface 3' relatively opaque. This negative, which is usually first stripped from its plate or support when formed in this manner and reversed, is then placed in juxtaposition to a surface—such, for instance, as a metal surface—having thereon a film or emulsion forming a sensitized surface, so that light passing through such transparent portion 4' of the negative acts to harden the corresponding part of the plate-surface—whereupon the same is treated in the usual manner to form a printing-surface. This is accomplished when a metal printing-surface is desired (although it is to be understood that other surfaces or positives can be obtained by the use of these improved models) by suitably protecting in the usual or any desired manner the relatively-hardened part of such sensitized metal surface and removing or washing away the unprotected portion thereof, after which the plate is subjected to a suitable mordant bath to permit the metal surface around the reproduced original to be bitten away and thereby leave the reproduced matter in relief, after which the protected portion of the sensitized surface is removed and so leaves the plate 8, Fig. 4, with its metal printing-faces 9 in relief and in condition to be inked for the purpose of imparting impressions.

When it is desired to form a printing surface or plate without the printing-faces thereof in relief, this is accomplished without the necessity of treating the plate to an etching process by so treating the plate that one part thereof will retain the printing-ink with which the impressions are to be imparted. This negative 7 can also itself be treated as hereinbefore set forth to form an intaglio surface, especially when the negative comprises a sensitized metal surface, since the unhardened character-field 4' can be washed away and so leave this portion of the plate bared to be treated by a suitable mordant which will bite into the plate and form the intaglio design in a similar manner to that about to be set forth.

In the formation of a negative adapted for use as an ink-printing surface or to form an intaglio printing-surface the models, Fig. 6, are in this instance in the nature of negative originals, each preferably having its character-field 4 white or of analogous efficiency, while its supporting or field surface 3 is black or of an analogous efficiency, so that when assembled and reproduced—as, for instance, by photography—the negative 7', Fig. 7, which in this instance has the reproduced originals thereof positive in form or character and which consists of any suitable support, such as metal having a sensitized surface, will have the corresponding character portions 4'' thereof relatively opaque and hardened, while the corresponding field portions will be relatively light or transparent and unhardened, so that when the negative is to be used as an ink-printing surface such field portions are readily washed away or removed in any suitable manner to leave the hardened character-fields 4'' in relief, Fig. 7, and in condition to be printed from or, if desired or necessary, to be suitably treated to increase their efficiency as an ink-printing surface, or the plate can be suitably treated in the desired manner, whereby one part thereof will retain the printing-ink, thereby to impart impressions. When this negative 7', however, is to be used to produce an intaglio printing-surface on metal or other suitable material, it usually comprises a sensitized medium adapted to permit the passage of the light and is placed in juxtaposition, with its outer field preferably unremoved, to a metal or other surface having a sensitized surface or emulsion, whereupon the light transmitted through the relatively transparent part or the surrounding field of such negative hardens the corresponding surrounding field of the sensitized surface of the metal plate and leaves the character-field thereof relatively unhardened, so that it is readily removed or washed away to permit further treatment of the plate, thereby leaving this portion of the plate bare, which after suitably protecting the relatively-hardened surrounding film is treated in some suitable manner—as, for instance, by subjecting it to a mordant bath—thereby to bite away the character portion of the metal surface. The surrounding relatively-hardened film will then be removed in any suitable manner, leaving an incised or intaglio printing-plate 10 adapted to be printed from.

When the printing-surfaces are formed on metal or like material—as, for instance, aluminium, zinc, or copper—whether it be the original negative having the reproduced characters thereof negative or positive in form or the resultant plates in relief or in intaglio or otherwise, they are blocked up in the usual manner for the purpose of placing them in the press to impart impressions.

From the foregoing it will be seen that by means of this improved process a printing surface or plate having matter thereon in relief or in intaglio or adapted to impart impressions is obtained in a direct manner from the original matter without the use in the operation of type, thereby doing away with the enormous cost of such type, as the cost of this original is inconsiderable as compared with the cost of type, and, unlike type, will not appreciably wear out under constant usage, and therefore does not have to be renewed. Moreover, from this one original any desired size of reproduction is obtainable without the necessity, as heretofore, of having different sizes of type and different sizes of type impressions; and also from this one original various forms of reproduced matter may ber eadily obtained—as, for instance, by the use of an adjustment-mirror in the camera or other reproducing instrumentality.

By the term "symbols" as used herein and in the claims it is intended to include characters, letters, figures, images, designs, marks, or analogous matter which can be assembled in the manner specified for reproduction.

In conclusion, it will be seen that the present invention contemplates the use of independent models—such, for instance, as supporting-surfaces bearing characters, letters, figures, symbols, and the like—and since the models are independent one of another, they are therefore interchangeable with one another, so that one can be removed and set aside while another can be disposed in place thereof, while at the same time one or more can be shifted without shifting the companion models.

I claim as my invention—

1. The method of forming a printing-surface, which consists in assembling a plurality of interchangeable photographable models comprising independent surfaces bearing symbols and adapted to be organized to form various subjects-matter and each formed free of a strip or bar, and then making therefrom a printing-surface.

2. The method of forming a printing-surface, which consists in assembling a plurality of interchangeable models comprising independent surfaces bearing symbols and adapted to be organized to form various subjects-matter and each formed free of a strip or bar; then making a reproduction thereof by the action of light; and then utilizing such reproduction to make a printing-surface adapted to impart impressions.

3. The method of forming printing-surfaces, which consists in assembling a plurality of interchangeable photographable models comprising independent surfaces bearing symbols and adapted to be organized to form various subjects-matter and each having structure free of a strip or bar, and then making by photography a reproduction thereof adapted to be treated to impart impressions or to be utilized as an intermediate instrumentality to produce a printing surface or plate.

4. The method of making a printing-surface, which consists in assembling a plurality of interchangeable and shiftable photographable models comprising independent surfaces bearing symbols and each formed free of a strip or bar and which when assembled form the matter to be reproduced; and then directly reproducing the same to form a printing-surface.

5. The method of making a printing-surface, which consists in assembling a plurality of interchangeable and vertically and horizontally adjustable photographable models comprising independent surfaces bearing symbols and adapted to be organized to form various subjects-matter and each formed free of a strip or bar and which when assembled form the matter to be reproduced; then making a reproduction thereof by the action of light; and then utilizing such reproduction to form a printing-surface adapted to impart impressions.

6. The method of forming a printing-surface, which consists in assembling a plurality of shiftable models comprising independent surfaces bearing symbols and adapted to be organized to form various subjects-matter and each formed free of a strip or bar, and then making a reproduction thereof by the action of light.

7. The method of making a printing-surface, which consists in assembling in position a plurality of photographable models comprising independent surfaces bearing symbols and adapted to be organized to form various subjects-matter and each formed free of a strip or bar and comprising one or more symbols, one model being readily separable from another; and then making a reproduction thereof by photography.

8. The method of forming a printing-surface, which consists in assembling a plurality of independent photographable models each comprising a card having letterpress-forming elements thereon, said cards being interchangeable so that they can be organized to have such letterpress-forming elements constitute any desired subject-matter; and then making by photography a reproduction of such elements.

9. The method of making a printing-surface, which consists in assembling letterpress matter in position to be reproduced on said printing-surface, such letterpress matter comprising a plurality of independent and separable photographable elements each formed free of a strip or bar; then directly reproducing such elements by photography to form a reproduction; and then utilizing such reproduction as an intermediate instrumentality to form a printing-surface.

10. The method of forming a printing-plate, which consists in assembling a plurality of photographable models, each comprising an independent card having one or more symbols thereon, said cards being interchangeable so that they may be organized to form a line, column, or page of matter, or a plurality thereof, and to have the symbols form any desired subject-matter corresponding with the desired printing-surface; and then making by photography a reproduction of such symbols and utilizing such reproduction to produce a printing-plate adapted to impart impressions.

11. The process of forming a printing-surface, which consists in assembling a plurality of independent and interchangeable photographable model-fields, each formed free of a strip or bar, and each comprising a character and a supporting surface one of different photographic efficiency from the other; then photographing the same to produce a negative having one part thereof of a different efficiency from another.

12. The method of forming a printing-surface, which consists in assembling in position a plurality of independent and interchangeable models, each formed free of a strip or bar and each comprising a character-field and a supporting-field, one of relatively low photographic efficiency and the other of relatively high photographic efficiency; then obtaining a reproduction thereof by the action of light; and then utilizing such reproduction to form a printing-surface adapted to impart impressions.

13. The method of forming a printing-surface, which consists in disposing in position a plurality of independent and interchangeable photographable models, each formed free of a strip or bar and each comprising a character-field of relatively low photographic efficiency and a supporting-surface of relatively high photographic efficiency; and then making by the action of light a reproduction thereof relatively transparent or clear in that part thereof corresponding with the character-field and relatively opaque in that part thereof corresponding with the supporting-field.

14. The art of forming a metal printing-plate, which consists in assembling a plurality of interchangeable or separable models comprising independent surfaces bearing symbols and each formed free of a strip or bar and constituting the matter to be reproduced; and then directly reproducing such matter on a sensitized metal surface and treating the same to adapt it to impart impressions.

15. The art of forming a metal printing-plate, which consists in assembling in position a plurality of interchangeable or separable models comprising independent surfaces bearing symbols and each formed free of a strip or bar and constituting the matter to be reproduced; then making a negative thereof by photography; then utilizing such negative to reproduce such matter by the action of light on a sensitized metal plate; and then treating such plate to form a printing-surface.

16. That improvement in the art of forming a printing-surface, which consists in disposing in position a plurality of independent and interchangeable photographable model-fields, each formed free of a strip or bar and each comprising a character and a supporting surface, one having a more highly-absorbent character than the other; then photographing the same to make a negative having one part thereof of greater transparency or clearness than the other; and then utilizing said negative as an intermediate instrumentality to form a printing-surface.

17. That improvement in the art of forming a printing-surface, which consists in disposing in position for photographing a plurality of interchangeable photographable models, each of said models comprising an independent surface having a part thereof in relief; and then photographing such models to produce a negative having a part thereof of relatively high efficiency as compared with another part thereof.

18. The method of forming a printing-surface, which consists in assembling a plurality of independent and interchangeable models, each comprising a structurally-formed character-field, and a supporting-surface; then obtaining a reproduction thereof by the action of light; and then utilizing such reproduction to make a printing-surface adapted to impart impressions.

19. That improvement in the art of forming a printing-plate, which consists in assembling in position for photographing a plurality of interchangeable models, each formed free of a strip or bar and each comprising an independent surface bearing a symbol; then photographing such models to obtain a negative having a relatively transparent portion, and a relatively non-transparent portion; then placing such negative in juxtaposition to a plate having an emulsion or film thereon and subjecting the same to the action of light, thereby to obtain a reproduction of such models; and then treating said plate so formed, thereby to produce a printing-surface adapted to impart impressions.

20. The herein-described printing-plate having letterpress matter thereon and adapted to impart impressions and produced by assembling in position a plurality of interchangeable photographable models comprising independent surfaces bearing symbols and each formed free of a strip or bar; then obtaining a negative thereof by photography; then utilizing such negative by the action of light to reproduce said models on a sensitized metal surface; and then treating said surface to form said printing-plate.

21. That improvement in the art of forming a printing-surface, which consists in assembling in position a plurality of independent and interchangeable or separable photographable models, each formed free of a strip or bar and comprising a character-field and a supporting-field, one having a different efficiency from the other; then photographing such models to obtain a negative having one part thereof relatively transparent and another part thereof relatively opaque; then placing such negative in juxtaposition to a plate or other surface previously treated and having a sensitized surface or film thereon and subjecting the same to light, thereby to obtain a reproduction of such models, having two fields, one relatively hardened and the other relatively unhardened; and then treating the plate to adapt it to impart impressions.

22. That improvement in the art of forming a printing-surface, which consists in assembling in position a plurality of independent and interchangeable photographable models, each formed free of a strip or bar and comprising a character-field and a supporting-field, said character-field having a different efficiency from said supporting-field, then photographing such models to obtain a negative having a relatively transparent character-field and a relatively opaque outer field; then placing such negative in juxtaposition to a plate or other surface having a sensitized emulsion or film thereon and subjecting the same to light, thereby to obtain a reproduction of said models having a relatively-hardened inner field and a relatively-unhardened outer field; then treating the plate so formed to permit the removal of the relatively-unhardened outer field, thereby to bare the plate; and then subjecting the plate to a mordant to form a printing-surface in relief.

23. A model comprising a supporting-field and a character-field having a raised edge and having adjacent to said character-field an extension for underlapping an adjacent model, and also having a portion for underlapping an adjacent line of assembled models, whereby said model is adapted for adjustment relatively to its companion model in the direction of an assembled line, and also adapted for adjustment transversely of the line, whereby said model may have a varible adjustment relatively to its companion models when assembled therewith.

JOHN T. BENTLEY.

Witnesses:
 FRANCIS H. RICHARDS,
 HERBERT M. HANKS.